March 25, 1958 A. MACOVSKI 2,828,356

CLAMPED SYNCHRONIZING SIGNAL SEPARATOR

Filed Dec. 7, 1951

INVENTOR
ALBERT MACOVSKI
BY Chin G. Mitchell
ATTORNEY

United States Patent Office 2,828,356

Patented Mar. 25, 1958

2,828,356

CLAMPED SYNCHRONIZING SIGNAL SEPARATOR

Albert Macovski, New York, N. Y., assignor to Radio Corporation of America, a corporation of Delaware Application December 7, 1951, Serial No. 260,437

6 Claims. (Cl. 178—7.3)

This invention relates to electrical circuits, and more particularly to electrical circuits designed to permit the passage only of those supplied signals having amplitudes falling below a predetermined amplitude level, without adversely affecting the waveforms of the signals so passed.

In one of its aspects, the present invention relates to noise immunity in the synchronizing and automatic gain control (AGC) circuits of television receivers.

It is an object of this invention to improve the immunity of signal processing circuits to noise impulses.

It is another object of this invention to prevent impulse noise from interfering with the operation of the synchronizing and AGC circuits of a television receiver.

In the illustrated embodiment of this invention, use is made of the fact that the television signal is independent of video modulation during the blanking interval, and of the fact that noise in general adds to the signal and does not subtract from it. Starting from a fixed voltage above the sync tips, such as B+ on a video amplifier, the minimum of the signal during the blanking interval is detected and used as the voltage reference for both sync separation and automatic gain control.

Other and incidental objects of the invention will be apparent to those skilled in the art after a reading of the following specification and an inspection of the drawing in which.

In the figures of the drawings, like components are designated by the same reference numerals.

Figure 1:
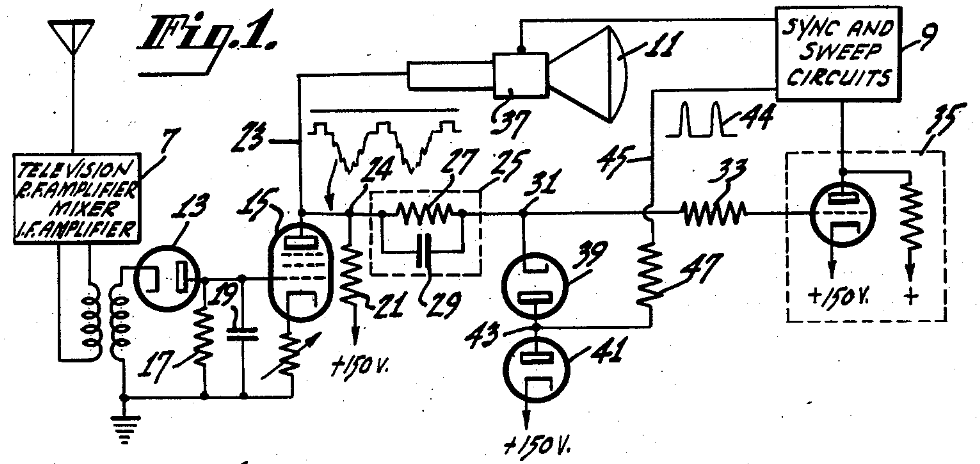
Figure 1 shows by block and circuit diagram a television receiver employing an embodiment of the invention.

Referring to Figure 1, there is shown a television receiver which includes a section 7 which comprises a radio frequency (R. F.) amplifier, a mixer, and an intermediate frequency (I. F.) amplifier. Details relating to these circuits, as well as those relating to the synchronizing (sync) and sweep circuits 9 and the kinescope 11, have not been shown, as they are well known to those skilled in the art.

The output signal of the video detector tube 13 is fed to the input electrode of a video amplifier tube 15. Resistor 17 and capacitor 19 are associated with the video detector tube 13. The anode of tube 15 is connected to a source of positive potential through resistor 21 and to kinescope 11 by means of lead 23. The anode of tube 15 is also connected to a terminal 24 of the parallel resistance-capacitance (RC) network 25 which comprises resistor 27 and capacitor 29. The other terminal 31 of the RC network 25 is connected through a resistor 33 to the input electrode of a conventional synchronizing signal separator 35. The output of the synchronizing signal separator 35 is connected to the sync and sweep circuits 9. The sync and sweep circuits 9 are connected to the deflection yoke 37 of kinescope 11. A first diode 39 has its cathode connected to terminal 31 of the RC network. The anode of this first diode 39 is connected to the anode of a second diode 41 through point 43. The cathode of the second diode 41 is connected to a source of constant positive potential, such, for example, as +150 volts.

Keying pulses 44, which occur during the occurrence of the recurrent pulse component of the television signal, are applied to point 43 by means of lead 45 and resistor 47. These pulses may be conveniently derived from the horizontal deflection output transformer, which is part of the block 9 labeled "sync and sweep circuits," and are chosen so that their peak amplitude is substantially greater than +150 volts.

The operation of the circuit of Figure 1 is as follows: diode 41 acts as a clamp to keep the peak of the keying pulses 44 at point 43 at +150 volts. During the occurrence of keying pulses 44, point 43 and the anodes of diodes 39 and 41 at a +150 volts potential. Capacitor 29 then charges to a voltage "V" which is equal to the difference between the potential at point 43 (i. e. +150 volts) and the potential of that part of the signal at the anode of the video amplifier tube 15 which represents minimum carrier amplitude during the occurrence of keying pulses 44.

As used in this specification, the term "recurrent pulse component" of a television signal is generic to "blanking pulses" and to "synchronizing pulses." The keying pulses 44 are said hereinbefore to "occur during the occurrence of the recurrent pulse component of the television signal." The duration and timing of the keying pulses 44 may vary and still stay within this definition. A few examples of the duration and timing of the keying pulses 44 are given in Figures 2(*a*), 2(*b*), 2(*c*), and 2(*d*), with the understanding that these examples do not constitute an exhaustive showing of all possibilities. It has been stated that capacitor 29 will charge to a voltage "V" which is equal to the difference between +150 volts and "the potential of that part of the signal at the anode of amplifier 15 which represents minimum carrier amplitude during the occurrence of keying pulses 44." It will be seen that in Figures 2(*a*), 2(*c*), and 2(*d*) "V" will be equal to the difference between +150 volts and the potential of the blanking level 49 of the television signal while in Figure 2(*b*) "V" will be equal to the difference between +150 volts and the potential of the tip of the synchronizing pulse 51 of the television signal.

Since noise can only add to a signal, and not subtract from it, the voltage representing minimum carrier amplitude during the occurrence of keying pulses 44 will not be affected by noise. Nor will the voltage "V" be affected by noise, since it represents the difference between a fixed potential (i. e. +150 volts) and a voltage not affected by noise.

Figure 2:
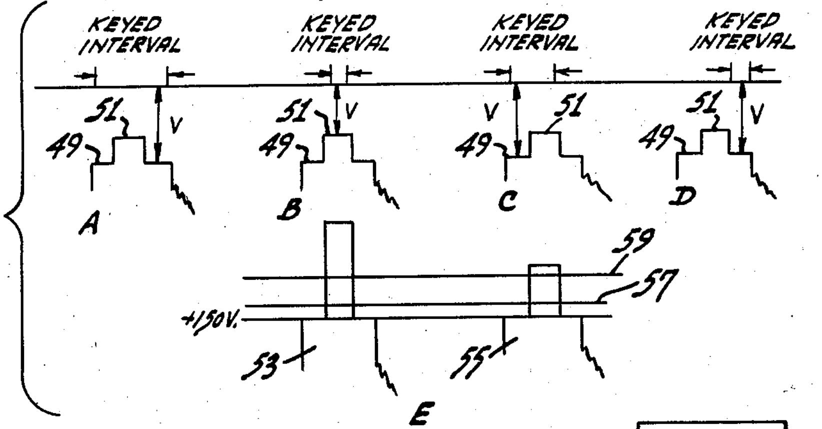
Figure 2 shows waveforms which will be helpful to those skilled in the art in understanding the operation of the circuit of Figure 1.

The voltage "V" across capacitor 29 is added to the voltage at the anode of the video amplifier 15, thus placing "the minimum carrier amplitude during the occurrence of the keying pulses 44" (which for purposes of the rest of this discussion we will assume to be blanking level) very close to +150 volts regardless of noise or signal strength. The bias voltages on the synchronizing signal separator 35 can be arranged so that the blanking level (which is always very close to +150 volts) falls below the cutoff potential of the tube, and so that the tips of the synchronizing pulse go into grid current. In this way the portion of the synchronizing pulse separated by the sync separator will be affected by either noise or signal strength. This is illustrated by Figure 2(*e*)

which shows the waveform present at point 31 for a strong signal 53 and for a weak signal 55, and the two clipping levels 57 and 59 of the sync separator 35. It can be seen that the portion of the sync pulse between levels 57 and 59 is the same for the strong signal 53 and the weak signal 55.

Figure 3:
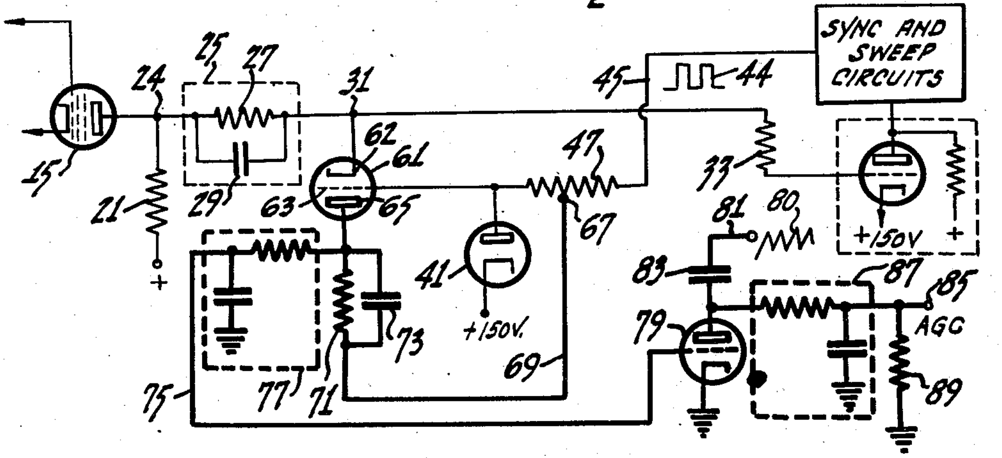
Figure 3 shows by block and circuit diagram a television receiver employing an embodiment of the invention together with an automatic gain control circuit.

Referring now to Figure 3, a triode 61 has its cathode 62 connected to terminal 31. Keying pulses, which may be of order of 500 volts, are applied to the control electrode 63 of triode 61 by means of lead 45 and resistor 47. A diode 41 acts as a clamp to keep the peaks of the keying pulses on the control electrode 63 at +150 volts. The anode 65 of triode 61 is connected to tap 67 on resistor 47 by means of lead 69 and resistor 71. Resistor 71 is bypassed by capacitor 73. The anode 65 of triode 61 is connected by means of lead 75 and filter 77 to the control electrode of an AGC tube 79. The cathode of the AGC tube 79 is connected to ground. A saw tooth wave 80, which may be of the order of 500 volts peak to peak, and which may be obtained by integrating deflection pulses, is applied by means of lead 81 and capacitor 83 to the anode of tube 79. The AGC terminal 85, at which the desired AGC potential is available, is connected to the anode of tube 79 through filter 87. A load resistor 89 is connected between the AGC terminal and ground.

The portion of the circuit of Figure 3 shown in lighter lines is similar to the circuit of Figure 1 and operates in the same manner, the two electrodes of diode 39 having been replaced by the cathode 62 and control electrode 63 of triode 61. The portion of the circuit of Figure 3 shown in heavier lines will enable us to obtain an AGC potential at the AGC terminal 85. The operation of this AGC portion of the circuit will now be discussed.

A keying pulse higher than +150 volts (+180 volts, for instance) is applied to anode 65 of triode 61 through lead 69. During the occurrence of the keying pulses, capacitor 29 (as in Figure 1) will charge to a voltage "V" which is equal to the difference between +150 volts and a potential which is a function of the incoming signal strength. The charging current flowing towards the cathode 62 during the occurrence of the keying pulses will be an inverse function of the incoming signal strength (the lower the signal strength, the more charging current) and the potential of anode 65 will also be a function of incoming signal strength (the lower the signal strength, the more the potential at anode 65 is reduced). The rest of the circuit is a convenient way to make use of this effect to obtain an AGC potential.

The potential at the control grid of tube 79 will be lower for a weak signal than for a strong signal. And the potential at the AGC terminal 85 will be less negative for a weak signal than for a strong signal. This is the desired AGC potential.

Having thus described my invention, what is claimed is:

1. In a television receiver adapted to receive signals having a recurrent pulse component, a video amplifier having an output terminal, a synchronizing signal separator circuit having an input terminal, a resistor connected between said amplifier output terminal and said synchronizing signal separator input terminal, a capacitor connected in shunt with said resistor, a unilateral conduction device having two electrodes, means connected with said unilateral conduction device for maintaining said device in a normally nonconducting condition, a connection between one electrode of said unilateral conduction device and the input terminal of said synchronizing signal separator circuit, and means to apply to the other electrode of said unilateral conduction device keying pulses synchronous with the recurrent pulse component of said signals for conditionally keying said unilateral conduction device into conduction.

2. A circuit according to claim 1 wherein there is additionally provided means coupled with said last named means for limiting the amplitude of said keying pulses as they are applied to said other electrode of said unilateral conduction device.

3. In a receiver adapted to receive a signal having a recurrent pulse component, a source of keying pulses substantially synchronous with said recurrent pulse component, means to obtain a control potential which is a function of the difference between a fixed potential and that part of the receiver signal representing minimum carrier amplitude during the occurrence of said keying pulses, means to obtain a resulting signal representative of the sum of said received signal and of said control potential, a synchronizing signal separator circuit having an input terminal, and means to apply said resulting signal to the input terminal of said synchronizing signal separator.

4. In a receiver adapted to receive a signal having a recurrent pulse component, a source of keying pulses substantially synchronous with said recurrent pulse component, means to obtain a first control potential which is a function of the difference between a fixed potential and that part of the received signal representing minimum carrier amplitude during the occurrence of said keying pulses, means to obtain a resulting signal representative of the sum of said received signal and of said control potential, a synchronizing signal separator circuit having an input terminal, means to apply said resulting signal to the input terminal of said synchronizing signal separator circuit, means to derive a second control potential which is a function of said first control potential, and means to apply said second control potential to said receiver to control its gain.

5. In a receiver adapted to receive a signal having a recurrent pulse component, a source of keying pulses occurring only during the occurrence of said recurrent pulse component, means to obtain a control potential which is a function of the difference between a fixed potential and that part of the received signal representing minimum carrier amplitude during the occurrence of said keying pulses, means to obtain a resulting signal representative of the sum of said received signal and said control potential, a synchronizing signal separator circuit having an input terminal, and means to apply said resulting signal to the input terminal of said synchronizing signal separator circuit.

6. In a receiver adapted to receive a signal having a recurrent pulse component, a source of keying pulses occurring only during the occurrence of said recurrent pulse component, means to obtain a control potential which is a function of the difference between a fixed potential and that part of the received signal representing minimum carrier amplitude during the occurrence of said keying pulses, means to obtain a resulting signal representative of the sum of said received signal and said control potential, a synchronizing signal separator circuit having an input terminal, means to apply said resulting signal to the input terminal of said synchronizing signal separator circuit, and means to apply said control potential to said receiver to control its gain.

References Cited in the file of this patent

UNITED STATES PATENTS

| | | |
|---|---|---|
| 2,244,240 | Blumlein | June 3, 1941 |
| 2,258,732 | Blumlein et al. | Oct. 14, 1941 |
| 2,521,146 | Blayney | Sept. 5, 1950 |
| 2,586,193 | Wendt | Feb. 19, 1952 |
| 2,586,957 | Keizer | Feb. 26, 1952 |
| 2,593,011 | Cotsworth | Apr. 15, 1952 |
| 2,598,929 | Moore | June 3, 1952 |
| 2,673,892 | Richman | Mar. 30, 1954 |